C. FORTH.
MIXER OR BEATER.
APPLICATION FILED APR. 28, 1910.
1,014,382.
Patented Jan. 9, 1912.
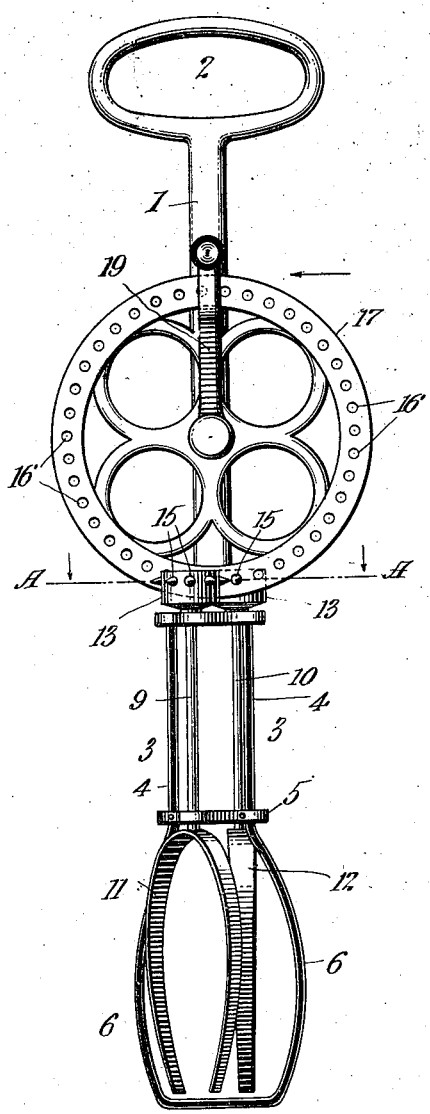
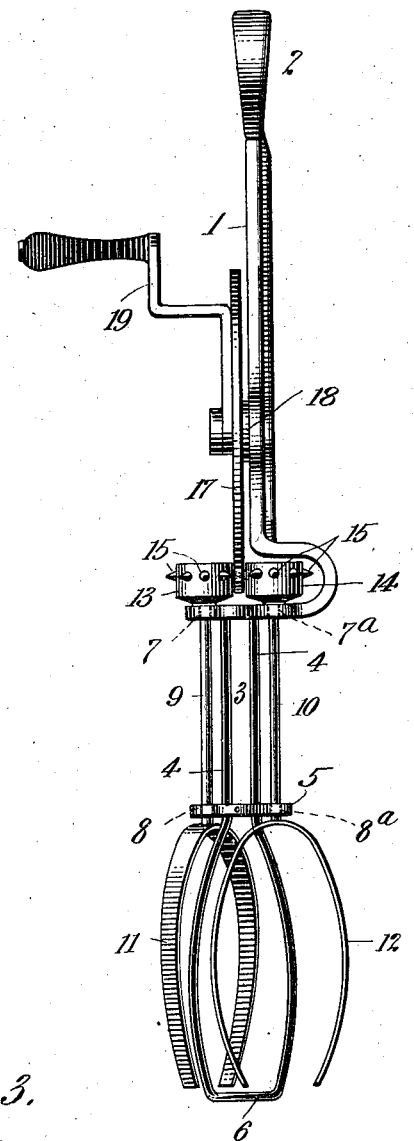
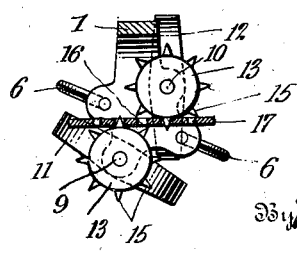
Witnesses:
Inventor
Charles Forth
By his Attorneys

UNITED STATES PATENT OFFICE.

CHARLES FORTH, OF BOSTON, MASSACHUSETTS.

MIXER OR BEATER.

1,014,382.

Specification of Letters Patent. Patented Jan. 9, 1912.

Application filed April 28, 1910. Serial No. 558,138.

*To all whom it may concern:*

Be it known that I, CHARLES FORTH, a citizen of the United States, residing at Boston, in the county of Suffolk and State of Massachusetts, have invented certain new and useful Improvements in Mixers or Beaters, of which the following is a specification, reference being had therein to the accompanying drawing.

This invention relates to mixers or beaters designed more particularly for beating eggs, and embodying usually a supporting frame on which are mounted rotary agitators or beaters driven by a rotary master wheel.

The objects of the invention are to produce a device of this character which will be simple and durable in construction, inexpensive to produce, effective in operation, and in which there will be little or no liability of the operative parts being clogged by the accumulation of dirt or grease.

With these ends in view the invention consists more particularly of an improved form of gearing for driving the beater arms, said gearing comprising a rotary master wheel formed with driving holes therethrough, and driven pinions arranged on opposite sides of the wheel, and provided with teeth adapted to engage through the holes, the said pinions being operatively connected with the beater arms, so that by the rotation of the master wheel, a rotary motion will be imparted to the pinions which will impart a corresponding movement to the beater arms.

The invention consists also in an improved form of frame for supporting the operative parts, more particularly the beater arms, to give them firm and extended support.

The invention consists also in an improved form of beater arm; and further, in the details of construction and combination of parts hereinafter described and claimed.

In the accompanying drawings: Figure 1 is a side elevation of my improved device; Fig. 2 is an edge view of the same looking in the direction of the arrow in Fig. 1; Fig. 3 is a horizontal transverse section on the line A, A, of Fig. 1, looking in a downward direction.

Referring to the drawing: the supporting frame of the beater consists of a bracket 1, having a handle 2 fixed to its upper end, and an extension 3 fixed to its lower end, said extension being in the form of two parallel rods 4 fixed at their upper ends to the lower end of the bracket and having fixed to their lower ends a horizontal plate 5. Fixed to the plate 5 and extending downwardly therefrom, is a looped extension 6, the purpose of which is to support the device when it is in operation in a vessel, so as to prevent the ends of the beater arms from coming in contact with the bottom of the vessel.

The lower end of the bracket portion of the frame is provided with vertical bearing openings 7, 7ª, arranged in alinement with corresponding bearing openings 8, 8ª, in the plate 5, in which bearing openings are mounted two parallel shafts 9 and 10, having connected rigidly with their lower ends, beater arms 11 and 12, each of U-form, arranged with their open ends downward. On the upper ends of the shafts 9 and 10 and above the bearings 7 and 7ª are fixed driven pinions 13 and 14, provided with teeth 15 in the form of conical pointed pins, which are adapted to engage through openings 16 in a vertical master driving wheel 17 journaled to the bracket portion of the frame, as at 18, and extending at its lower portion between the two pinions, the axes of the latter being so disposed relatively to each other and to the wheel that the teeth of the respective pinions will engage simultaneously in different holes of the wheel, as shown in Fig. 3. The master wheel has affixed to it an operating crank 19 for imparting to the wheel a rotary motion.

As a result of the construction described, it will be observed that when the master wheel is rotated, the holes therein will engage around the teeth on the pinions and will cause said pinions to rotate in opposite directions, thereby imparting a corresponding motion to the open ended beater arms. By reason of this form of the driving gearing, there will be no danger of the parts becoming clogged by the accumulation of dirt or grease, the engagement of the teeth through the holes on the master wheel acting to automatically keep said holes open and preventing the accumulation therein of dirt. Further it will be observed that the shafts which carry the beater arms are mounted each in two bearings widely separated from each other, so that the shafts are firmly sustained and their uniform rotation and parallelism preserved. It will also be seen that the axes of the beater arms, represented by the shafts 9 and 10, are arranged respectively on opposite sides of the plane of the looped frame 6, the limbs of the beater arms in their rotation passing through the frame, and by coöperating with the same in this manner, effecting a thorough agitation and mixture of the material being beaten.

The device as a whole is strong and durable, free from liability of clogging, and of unusual effectiveness in operation, the manner of mounting the beater arms and driving them, causing the same to operate with ease and uniformity and effectually preventing the binding of the parts.

While in the accompanying drawings I have shown my invention in the form I prefer to adopt and which in practical operation has been found to answer to a satisfactory degree the ends to be attained, it will be understood that my invention is not limited to any specific form or arrangement of the parts except in so far as such limitations are specified in the claims.

Having thus described my invention, its construction and mode of operation, what I claim and desire to secure by Letters Patent of the United States is as follows:

1. In a beater the combination with a rotary driving wheel formed with driving holes extending entirely therethrough, of driven pinions arranged on opposite sides of the wheel and provided with teeth adapted to engage in said holes, and beater arms operated by said pinions whereby the teeth will serve to prevent the lodgment of dirt in the holes.

2. In a beater the combination with a rotary driving wheel formed with driving holes therethrough, of driven pinions arranged on opposite sides of the wheel and provided with teeth adapted to engage in said holes, the said pinions being so disposed relatively to each other that the teeth of the respective pinions will engage simultaneously different holes in the wheel, and beater arms operated by the pinions.

3. In a beater the combination with a rotary driving wheel formed with a single row of driving holes therethrough, of driven pinions arranged on opposite sides of the wheel and provided with teeth adapted to engage in said holes, the said pinions being so disposed relatively to each other that the teeth of the respective pinions will simultaneously engage different holes in the wheel, and beater arms operated by the pinions.

In testimony whereof I have affixed my signature in presence of two witnesses.

CHARLES FORTH.

Witnesses:
FRANK G. PARKER,
F. L. FULLER.